US012698163B2

(12) United States Patent (10) Patent No.: US 12,698,163 B2
Gilbert (45) Date of Patent: Aug. 4, 2026

(54) CONVEYOR BELT SCRAPER

(71) Applicant: MARK GILBERT IP PTY LTD, Bucasia (AU)

(72) Inventor: Mark Gilbert, Mackay (AU)

(73) Assignee: MARK GILBERT IP PTY LTD, Bucasia (AU)

( * ) Notice: Subject to any disclaimer, the term of this patent is extended or adjusted under 35 U.S.C. 154(b) by 155 days.

(21) Appl. No.: 18/557,719

(22) PCT Filed: Apr. 28, 2022

(86) PCT No.: PCT/AU2022/050391
§ 371 (c)(1),
(2) Date: Oct. 27, 2023

(87) PCT Pub. No.: WO2022/226595
PCT Pub. Date: Nov. 3, 2022

(65) Prior Publication Data
US 2024/0208739 A1 Jun. 27, 2024

(30) Foreign Application Priority Data
Apr. 28, 2021 (AU) ................................ 2021901254

(51) Int. Cl.
*B65G 45/16* (2006.01)
(52) U.S. Cl.
CPC .................................... *B65G 45/16* (2013.01)
(58) Field of Classification Search
None
See application file for complete search history.

(56) References Cited

U.S. PATENT DOCUMENTS

| | | | | |
|---|---|---|---|---|
| 4,838,409 | A | 6/1989 | Rappen | |
| 5,197,587 | A * | 3/1993 | Malmberg | B65G 45/16 198/497 |
| 7,308,980 | B2 * | 12/2007 | Peterson | B65G 45/12 198/497 |
| 7,367,443 | B2 * | 5/2008 | Swinderman | B65G 45/16 198/497 |
| 7,461,736 | B2 * | 12/2008 | Waters | B65G 45/12 198/497 |
| 9,586,765 | B2 * | 3/2017 | Krosschell | B65G 45/16 |
| 9,738,456 | B1 * | 8/2017 | Grimm | B65G 45/12 |
| 12,037,202 | B2 * | 7/2024 | Hutton | B65G 45/12 |

FOREIGN PATENT DOCUMENTS

| | | |
|---|---|---|
| EP | 1065158 B1 | 3/2004 |
| WO | 2018111743 A1 | 6/2018 |

OTHER PUBLICATIONS

Budinski, Damir (Authorised Officer), International Search Report and Written Opinion for International Application No. PCT/AU2022/050391 mailed on Jul. 7, 2022, 11 pages.

* cited by examiner

*Primary Examiner* — Kavel Singh
(74) *Attorney, Agent, or Firm* — MH2 Technology Law Group, LLP

(57) ABSTRACT
A conveyor belt scraper comprising a body having a proximal mounting base and a distal scraping tip, the mounting base includes a first engagement formation configured to engage with a second engagement formation located on a shaft assembly, wherein the first engagement formation and the second engagement formation are corresponding male and female members which are engaged or disengaged by rotation of the scraper relative to the shaft assembly about a longitudinal axis of the shaft assembly.

16 Claims, 7 Drawing Sheets

170

180

210

220

230

200

240

175

180

183

184

182

186

140

100

CONVEYOR BELT SCRAPER

CROSS-REFERENCE TO RELATED APPLICATIONS

This patent application is a U.S. National Stage application of International Application No. PCT/AU2022/050391 filed on Apr. 28, 2022, which claims the benefit and priority of Australian Patent Application No. 2021901254, filed on Apr. 28, 2021, the entire disclosures of both of which are incorporated by reference herein in their entireties as part of the present application.

TECHNICAL FIELD

The present disclosure relates to a conveyor belt scraper. In particular, the present invention relates to a conveyor belt scraper for use with coal, various ores, or minerals. However, it will be appreciated by those skilled in the art that the conveyor belt scraper can be applied to other applications and industries.

BACKGROUND OF THE INVENTION

Coal is generally extracted by either underground mining operations, or open-cut mining operations. After extraction of the raw coal, it is necessary to process the raw coal into final products depending on the intended market, and the quality and composition of the raw coal. Typical processing includes crushing to a uniform size and beneficiation. Beneficiation may include washing and other processes to remove ash, sulphur, and rock particles. Coal has properties which dictate that coal particles and/or coal slurry are particularly susceptible to sticking to conveyor belts, especially at certain moisture levels.

During processing, and/or transportation, it is common for the coal to be transported on conveyor belts between locations, and between process stages. It is typical for some coal to become stuck to the belt. This is especially common when the coal is wet or has been wet during beneficiation. It is important to remove any coal from the conveyor belt which has become adhered to the belt. This is important to prevent the coal from damaging any drive machinery located on the underside of the belt. This is also important to improve conveyor belt efficiency to ensure most of the material is unloaded. Furthermore, any coal or sludge which proceeds to the underside of the conveyor belt can be difficult to access and hence remove later.

In order to remove excess coal which has not fallen off the conveyor due to gravity as the conveyor belt changes directions, conveyor scrapers are often installed on the underside of the conveyor belt, adjacent to a roller which normally directs the belt around 180 degrees. The conveyor scraper is generally in the form of a metal blade which scrapes across the surface of the conveyor belt, physically scraping any coal from the surface. The scraped coal is caught and returned to the processing line.

In a typical conveyor belt installation, there are two sets of scrapers, namely primary and secondary scrapers. The primary scrapers are located near the location where the conveyor belt changes direction, and these scrapers remove the bulk of the material which is stuck to the belt. On the underside of the belt, additional secondary scrapers may also be deployed to subsequently clean any material that was not removed by the primary scrapers.

Whilst the process has been described with application in coal processing, it will be appreciated that it is applicable to processing other minerals, and use in other industries such as food processing and agriculture etc.

There are several drawbacks associated with existing scraper blades. One issue concerns the scraper blades being destroyed or at least damaged by the coal. To extend the life of the scraper blades, some scraper blades are manufactured with resilient zones intended to elastically deform when the metal scraper tip encounters an obstruction.

Such resilient blades are known to still suffer from damage during use on account of the large loads that may be applied, and owing to the limited amount of elastic deformability.

The process of replacing damaged scraper blades generally requires the conveyor belt to be stopped, which accordingly requires the coal processing or transportation to be temporarily halted. This can be costly due to replacement scraper blade costs, labour, and undesirable process downtime.

When replacing the scraper blade, it is often necessary for a technician to work in the zone located in front of the conveyor belt, or beneath the conveyor belt. This is generally undesirable as the technician could be injured by unstable material which may fall from the conveyor belt unexpectedly. In addition, this zone is often very slippery due to liquid that has fallen from the underside of the belt on the return path.

Accordingly, existing scraper blades suffer from undesired damage and hence reduced longevity during use. In addition, their replacement and maintenance can be challenging.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a conveyor belt scraper comprising:
  a body having a proximal mounting base and a distal scraping tip, the mounting base includes a first engagement formation configured to engage with a second engagement formation located on a shaft assembly,
  wherein the first engagement formation and the second engagement formation are corresponding male and female members which are engaged or disengaged by rotation of the scraper relative to the shaft assembly about a longitudinal axis of the shaft assembly.
Preferably the first engagement formation and the second engagement formation both extend helically around the longitudinal axis of the shaft assembly.

The first engagement formation is preferably defined by a female channel formed in the mounting base, and the second engagement formation is preferably defined by a helical projection which extends radially away from the shaft assembly in both circumferential and longitudinal directions.

The first engagement formation preferably includes a first locking formation, and the second engagement formation includes a second locking formation.

The first locking formation is preferably defined by a region of increased cross-sectional area located at or near a distal end of the first engagement formation.

The first engagement formation preferably has a generally circular cross-sectional area.

The second engagement formation preferably has a cross-sectional profile having a T-shaped appearance.

The proximal mounting base preferably includes a curved recess extending in a direction which is parallel with the longitudinal axis of the shaft, the curved recess having a cross-sectional profile in the form of a segment of a circle, and corresponding with an outer diameter of the shaft assembly.

The shaft assembly preferably includes a plurality of shaft sections configured to be connected end to end with other like shaft sections.

The shaft sections are preferably connected end to end with corresponding male and female engagement formations.

Each shaft section is preferably provided as an open collar having a longitudinally extending channel.

The shaft assembly preferably includes an internal shaft configured to be located within the shaft sections.

The internal shaft preferably includes a longitudinally extending rib configured to engage with the longitudinally extending channel of each shaft section.

The conveyor belt scraper further preferably comprises a locking block mounted to one of the shaft sections and configured to abut against an end conveyor belt scraper to prevent the conveyor belt scraper from moving relative to the shaft section.

The locking block is preferably provided in the form of a generally rectangular prism, with a curved channel formed on an underside, the curved channel is configured to abut with the shaft section, such that the locking block is slidable relative to the shaft section parallel to a longitudinal axis, and the locking block can be selectively isolated relative to the shaft section.

A fastener preferably extends through a longitudinally extending slot formed in the locking block.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Several embodiments of conveyor belt scrapers 100, 200 are disclosed herein. In particular, the conveyor belt scrapers 100 of FIGS. 1 to 6 are primary scrapers. In contrast, the conveyor belt scraper 200 of FIGS. 7 to 11 are secondary scrapers. However, the primary and secondary scrapers 100, 200 share a similar mounting assembly for securement to a bar or shaft.

Figure 1:
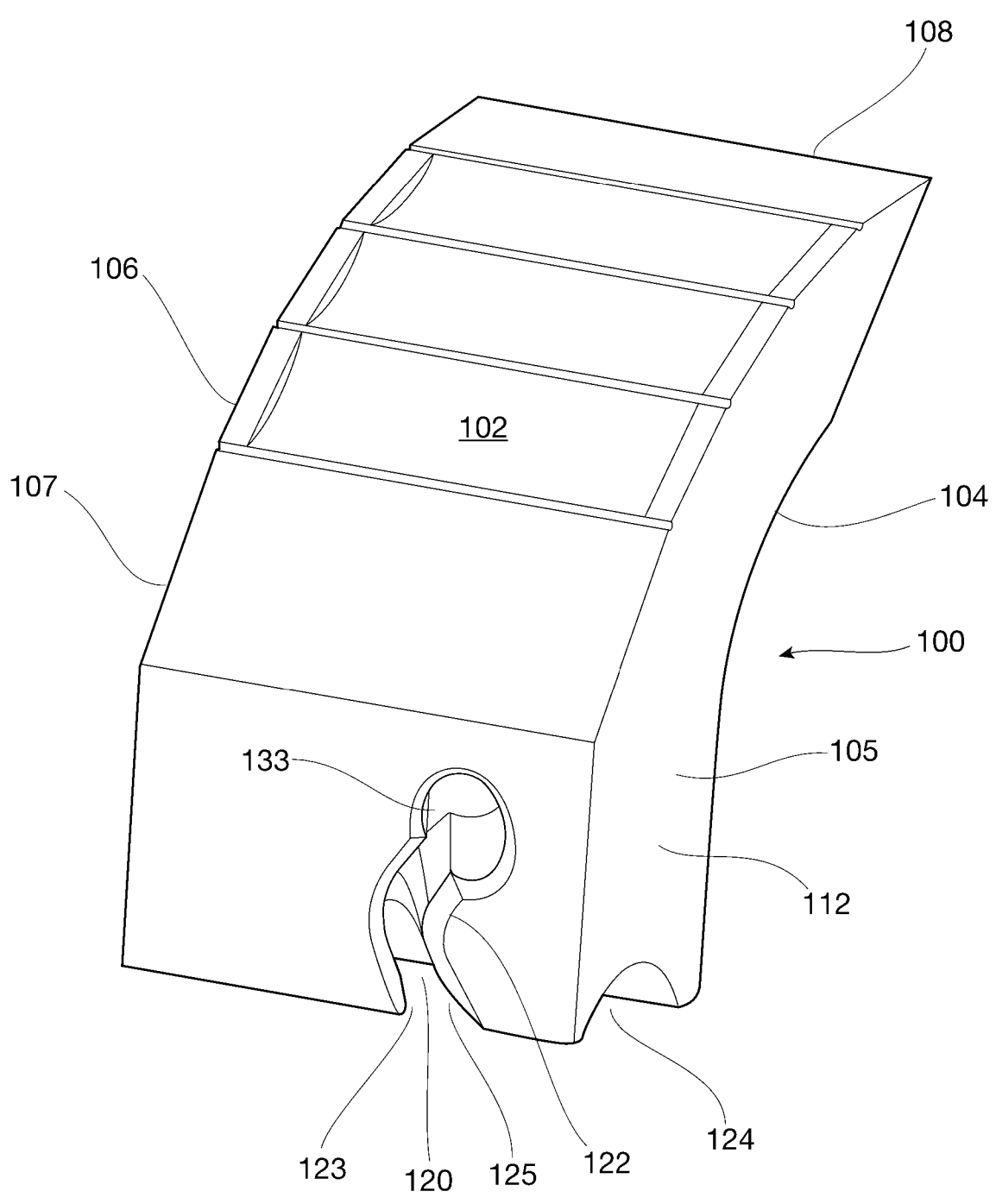
FIG. 1 is a perspective view of a primary conveyor belt scraper according to the invention.
Figure 2:
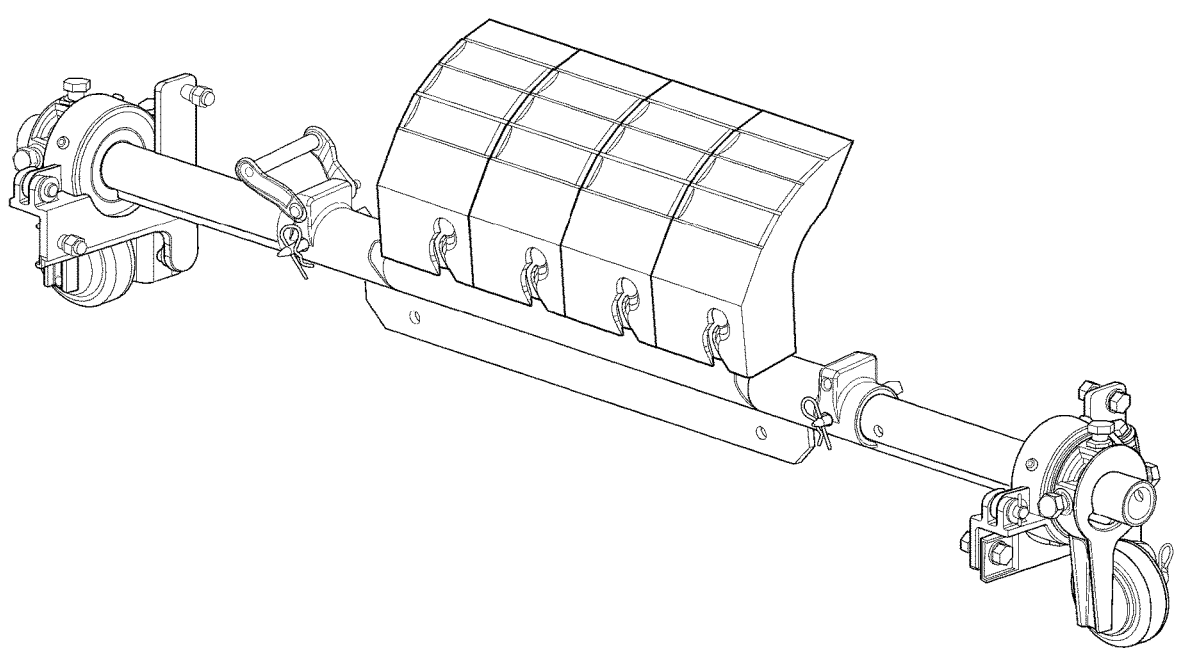
FIG. 2 depicts four of the primary conveyor belt scrapers of FIG. 1 fitted to a support assembly.

Referring to FIG. 1, a primary conveyor belt scraper 100 is depicted in isolation. The conveyor belt scraper 100 has a longitudinally extending body 102, with two side walls 105, 107 that are generally parallel. The body 102 has a concave side 104 and a convex side 106. The concave and convex sides 104 and 106 converge at the scraping tip 108. In use, the primary conveyor belt scraper 100 is positioned adjacent to the location where the conveyor belt changes direction. The convex side 106 is generally facing upward, such that scraped coal (or other conveyed material) is directed away from the belt by the scraping tip 108, and passes across the convex side 106.

The primary conveyor belt scraper 100 includes a mounting base 112. The mounting base 112 is located at the proximal end of the scraper 100 which is furthest from the scraping tip 108. The mounting base 112 includes a first engagement formation 120 configure to secure the mounting base 112 to a shaft assembly or bar 130. The shaft assembly 130 is depicted in isolation in FIG. 3.

The underside of the primary conveyor belt scraper 100 includes a curved recess 124. The curvature is in the form of a segment of a circle, and corresponds with the dimension of the radius of the shaft 130.

The first engagement formation 120 is defined by a channel 122. In a preferred embodiment, the channel 122 is helical, such that the channel 122 extends diagonally through the mounting base 112 between the channel entry slot 125 located on the convex side 106, and the end of the channel 122 which terminates adjacent to the concave side. The channel 122 is a blind channel, meaning it does not pass completely through the mounting base 112, but terminates close to the concave side 104. Although described and depicted herein as a helical channel 122, it will be appreciated that the channel could alternatively be circumferential.

The primary conveyor belt scraper 100 is fabricated from a polymer, and has no internal support members or stiffening components.

A proximal end 123 of the channel 122 is located closest to the shaft 130. The channel 122 has a distal end having a first locking formation, which in the embodiment of FIG. 1 is defined by a region of increased cross-sectional area 132. In the embodiment depicted in FIG. 1, the region of increased cross-sectional area 132 is generally circular aperture 133 which also follows a radial extension of the helical path defined by the channel 122. It will be appreciated that the locking formation may be provide in other shapes, and it is not limited to a circle. The locking formation simply provides a mechanism to prevent the second engagement formation (discussed below) of the shaft from being radially retracted from the channel 120.

Figure 3:
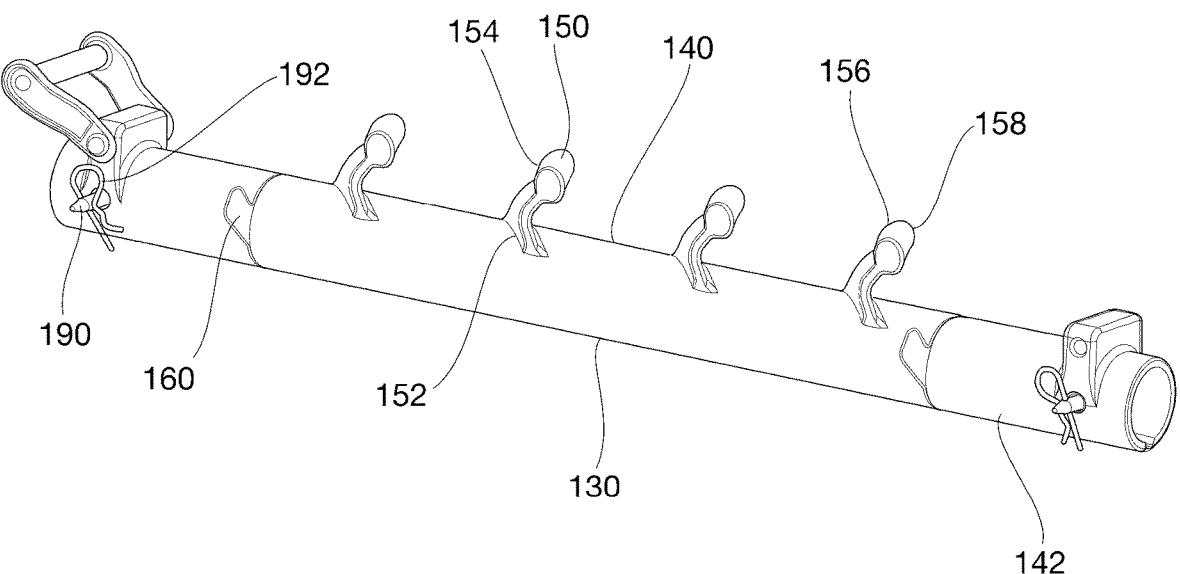
FIG. 3 shows a portion of the support assembly of FIG. 2.
Figure 4:
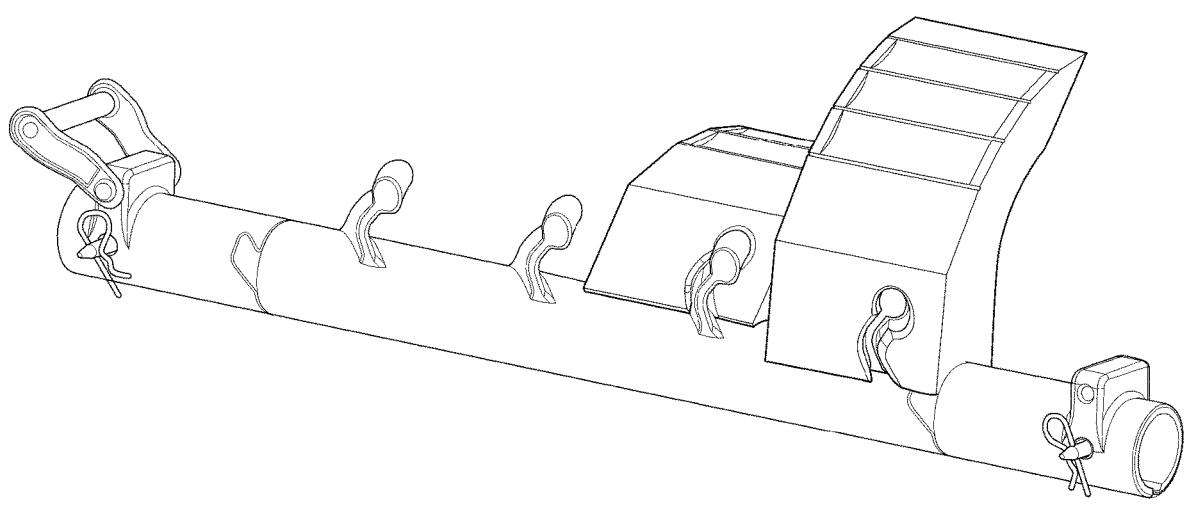
FIG. 4 depicts a first primary conveyor belt scraper mounted on the support assembly, and a second primary conveyor belt scraper being added.
Figure 5:
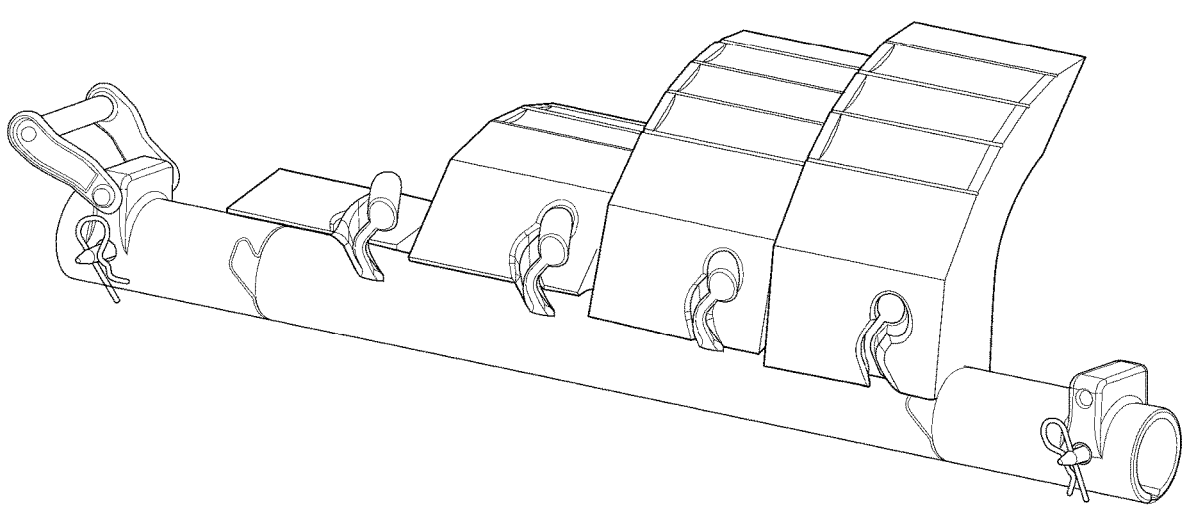
FIG. 5 depicts a first primary conveyor belt scraper mounted on the support assembly, and three further primary conveyor belt scrapers being added.
Figure 6:
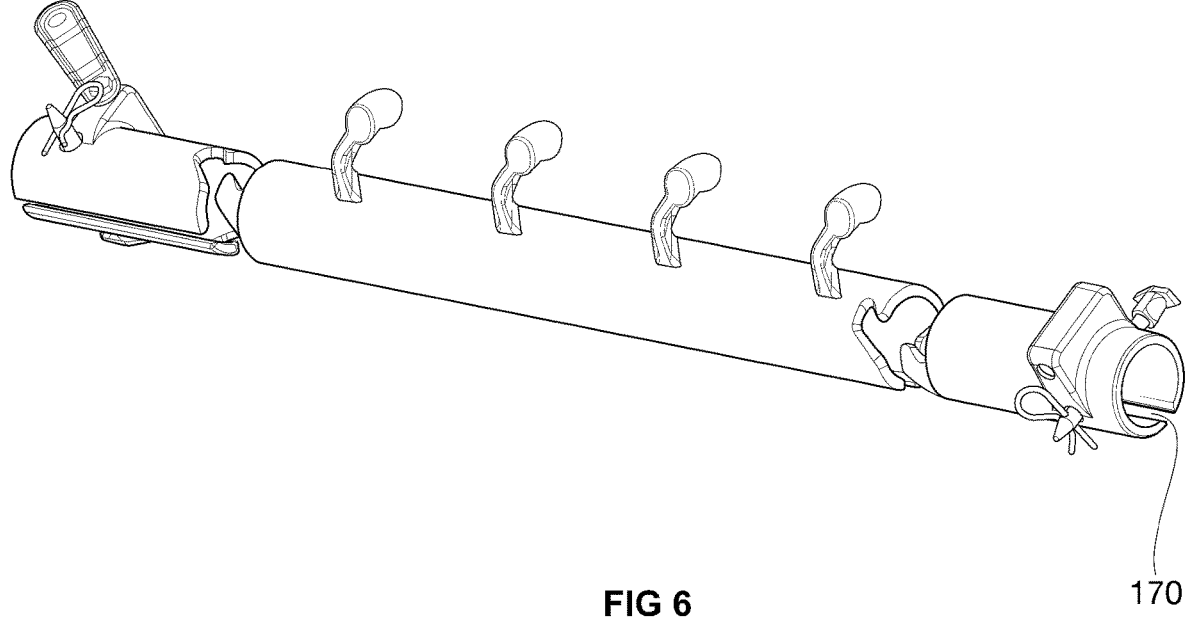
FIG. 6 depicts a shaft of the support assembly.

Referring to FIG. 3, a single shaft section 140 of the shaft 130 is depicted along with opposing shaft end mounts 142. The shaft end mounts 142 are used to secure the shaft 130 relative to the conveyor belt. The shaft 130 may be resiliently secured with a damping system, typically in the form of air bags or springs. The damping system enables the shaft 130 to be temporarily deflected if a large load is applied to one or more of the scrapers 100, 200, to reduce the likelihood of scraper blade damage.

The shaft 130 is modular and may be formed by connecting a plurality of similar shafts sections 140. The shaft sections 140 can be added to either longitudinal end, which enables a long shaft 130 to be assembled within a limited area. It also enables the shaft 130 to be retracted from the lateral side of the conveyor belt in stages, even when there is minimal clearance. This is desirable in some conveyor belt installations, such as in underground mining operations where there is often limited clearance at the side of the conveyor belt, meaning that any shaft maintenance or scraper maintenance/replacement must be performed in front of the conveyor belt which is undesirable.

Each shaft section 140 includes a second engagement formation 150. The second engagement formation 150 is provided in the form of a helical projection which extends radially away from the shaft section 140. The helix is also longitudinally extending. The proximal end 152 of the second engagement formation 150 is attached to the shaft section 140, and the distal end 154 of the second engagement formation 150 is located furthest from the shaft section 140. The distal end 154 includes a second locking formation 156 in the form of a rib 158 having a generally circular cross-sectional area. The rib 158 is sized to fit within the circular aperture 133.

The second engagement formation 150 is sized to be complimentary with the first engagement formation 120. As such, it will be appreciated that the specific shapes of the first and second engagement formations 120, 150 may vary and are not limited to those described and depicted herein.

Whist the conveyor belt scraper 100 has been described in the context of the first engagement formation 120 being male, and the second engagement formation 150 being female, it will be appreciated that the invention could alternatively be embodied on the contrary sense, such that the female formation is located on the shaft 130.

To engage the first engagement formation 120 with the second engagement formation 150, the curvature of the shaft 130 is seated against the curved recess 124 located on the underside of the mounting base 112. By inserting the second engagement formation 150 into the first engagement formation in the form of the channel entry slot 125, the shaft 130 and scraper 100 are brought into engagement. By further rotating the conveyor belt scraper 100, it rotates helically around and along the longitudinal axis of the shaft 130.

Figure 7:
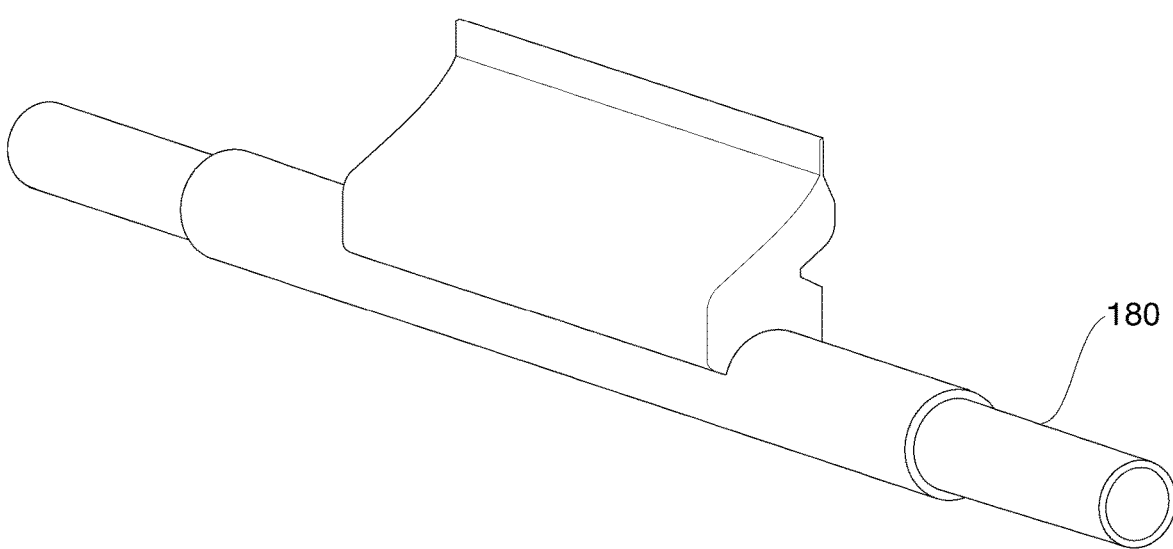
FIG. 7 depicts a group of secondary conveyor belt scrapers mounted on a support assembly.
Figure 8:
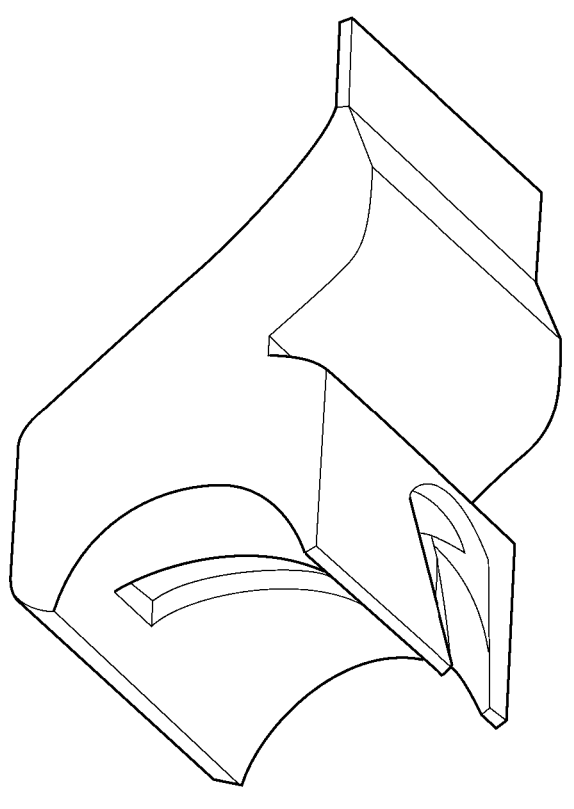
FIG. 8 is a perspective view of a secondary conveyor belt scraper according to the invention.
Figure 12:
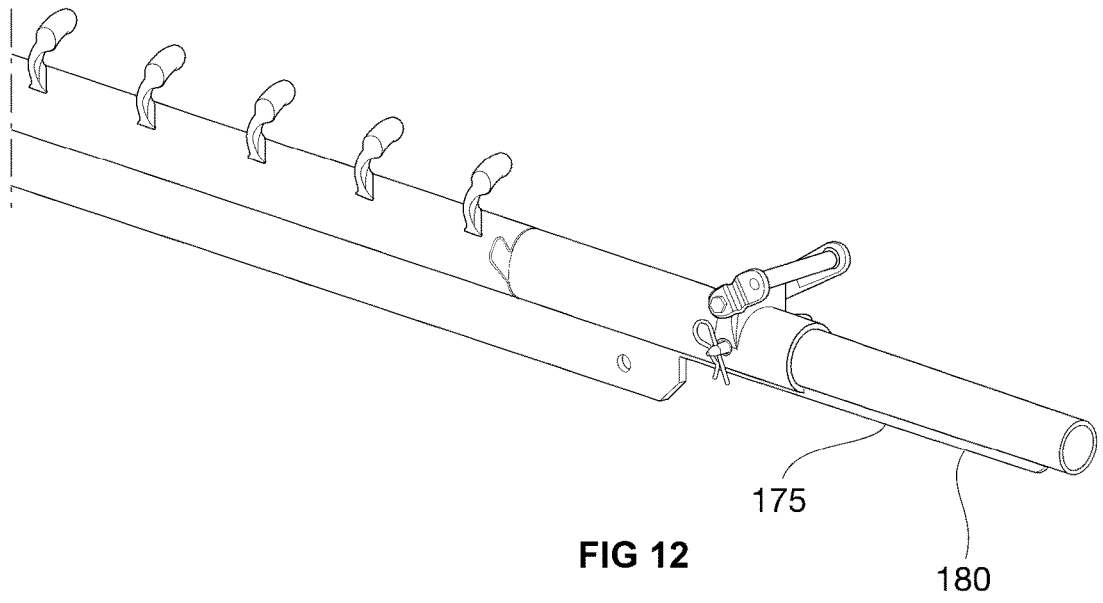
FIG. 12 is a perspective view of the support assembly of FIG. 6.

Each shaft section 140 is provided as an open collar with a longitudinally extending channel 170 (FIG. 6), when viewed through a plane extending perpendicular to a longitudinal axis. At each end of each shaft section 140, the shaft section 140 has a connector 160, and there is a male connector located at one end and a corresponding female connector located at the opposing end. The connectors 160 enable the shaft sections 140 to be connected end to end. The connectors 160 are male and female, and complementary in shape. The shaft sections 140 are seated on an internal shaft 180, as depicted in FIGS. 7 and 12. The internal shaft 180 has a longitudinally extending rib 175 (FIG. 12) which is configured to lock and engage with the channel 170. When the internal shaft 180 is located within a pair of longitudinally interconnected shaft sections 140, the engagement between the channel 170 and the rib 175 serves the purpose of preventing rotation of the internal shaft 180 relative to the external shaft sections 140. Furthermore, this also serves the purpose of preventing the connectors 160 from being decoupled, as decoupling can only be performed by moving the adjacent shaft sections 140 in a direction that is generally perpendicular to a longitudinal axis XX, and that movement is not possible while the internal shaft 180 is internally located.

Figure 13:
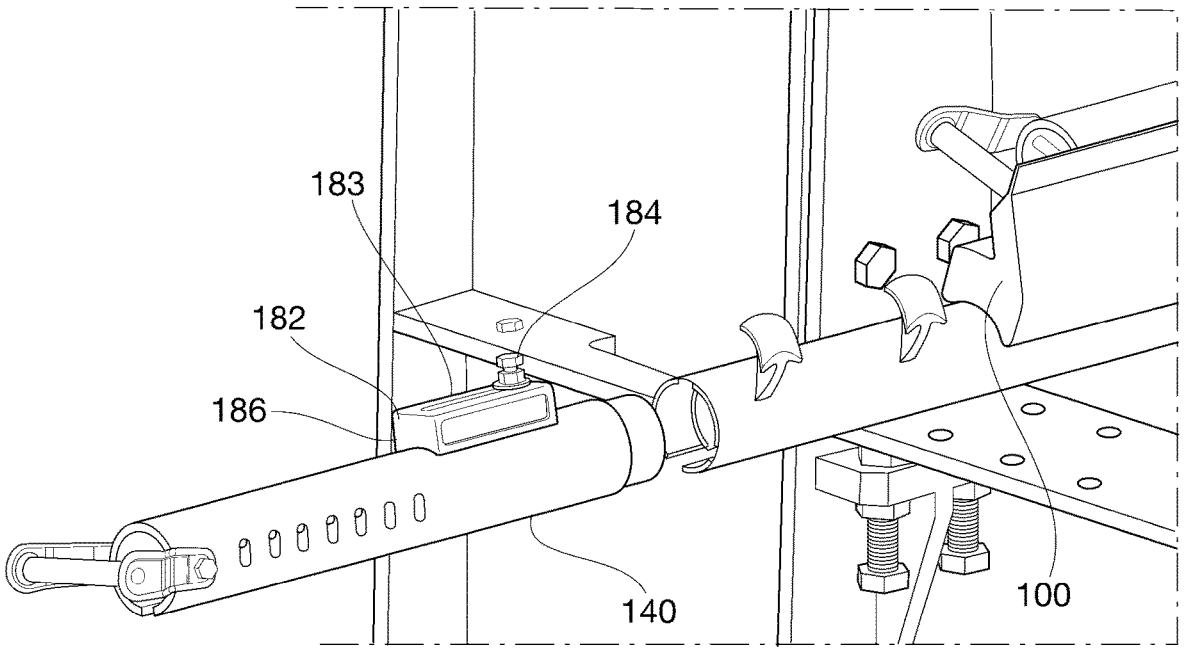
FIG. 13 is a partial perspective view of a shaft section and locking block of the support assembly.

In an alternative embodiment depicted in FIG. 13, the adjacent shaft sections 140 may be coupled with bayonet type male and female formations that engage when rotated about a longitudinal axis.

When a technician wishes to replace one or more of the conveyor belt scrapers 100, the opposing shaft end mounts 142 are decoupled from the support and damping device to which they are attached. Referring to FIG. 3, the cotter pin 192 and locking pin 190 are removed. This decouples the internal shaft 180 and the external shaft sections 140, enabling them to be moved axially relative to each other. As each set of engaged connectors 160 moves beyond the end of the underlying internal shaft 180, the connectors 160 are free to be decoupled by moving the shaft section 140 which is no longer located around the internal shaft 180 in a lateral direction.

This enables the conveyor belt scrapers 100 to be removed or changed in a relatively small clearance, typically only requiring a lateral clearance adjacent to the conveyor belt being slightly larger than the length of the individual shaft sections 140.

Regarding FIG. 13, a locking block 182 may be provided. The locking block 182 is secured to one of the individual shaft sections 140 with a bolt 184. The bolt passes through a longitudinally extending slot formed 183 in the locking block 182, and engages with a threaded hole formed in the shaft section.

The locking block 182 is provided in the form of a generally rectangular prism, with a curved channel 186 formed on an underside. The curved channel 186 is configured to abut in a complimentary manner with the shaft section 140. The locking block 182 is slidable relative to the shaft section 140 parallel to a longitudinal axis. Tightening the bolt 184 results in the locking block 182 being secured in position relative to the shaft section 140. In operation, the locking block 182 is secured at a position where it will abut against the conveyor belt scrapers 100, 200. This securement prevents the end scraper in the row (and hence each adjacent scraper) from being released relative to the shaft section 140 during use, because the end conveyor belt scraper 100, 200 needs to move axially as well as rotationally when it is removed.

In order to remove the end conveyor belt scraper 100, 200, the bolt 184 is loosened to enable the axial movement of the locking block 182 relative to the shaft section 140, away from the conveyor belt scraper 100, 200.

The second embodiment of the conveyor belt scraper 200 is depicted in FIGS. 7 to 11. The conveyor belt scraper 200 is a secondary scraper, intended for placement below the conveyor belt, on the return path. The mounting arrangement is similar, and the points of difference will be discussed below. In particular, referring to FIG. 10, the shape of the first and second engagement formations is generally T-shaped in cross-section. However, a helical path is still followed having both circumferential and axial displacement as the scraper 200 moves toward or away from the locked position.

In the embodiments described above, the path followed by the scraper 100, 200 when engaging with or disengaging from the shaft sections 140 is helical. However, it will be appreciated that in an alternative embodiment, the path may be circumferential only, such that the second engagement formation 150 extends in a circumferential but not longitudinal direction. In that embodiment, the scraper 100, 200 does not move linearly relative to the shaft section 140 during engagement or disengagement.

Figure 9:
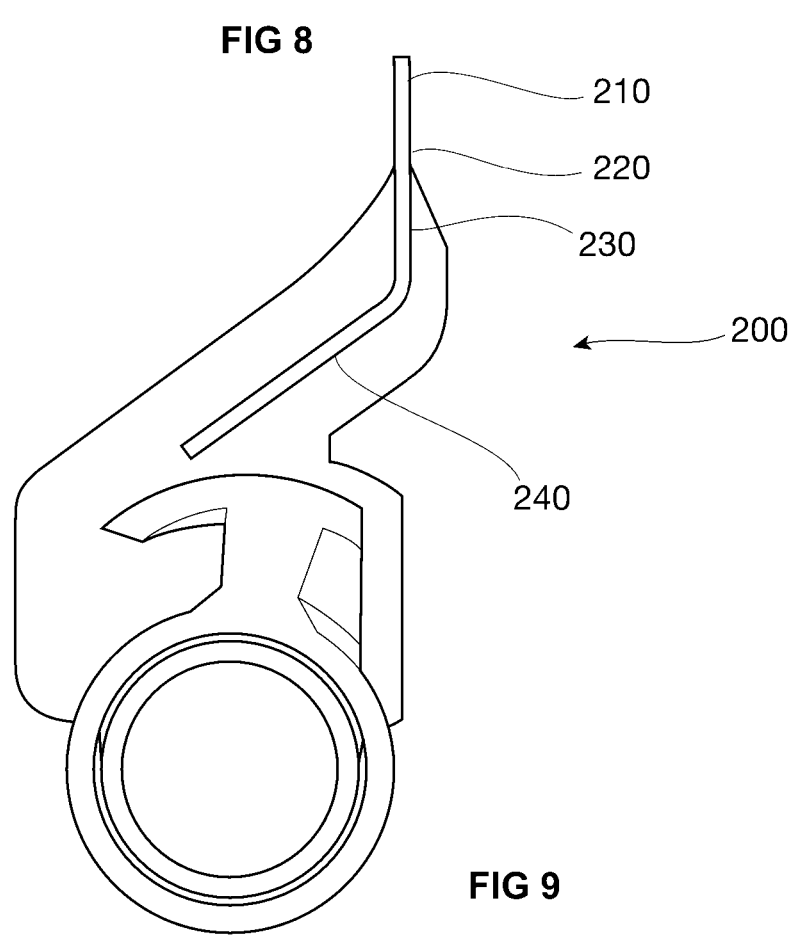
FIG. 9 is a side cross-sectional view of the conveyor belt scraper of FIG. 8.
Figure 10:
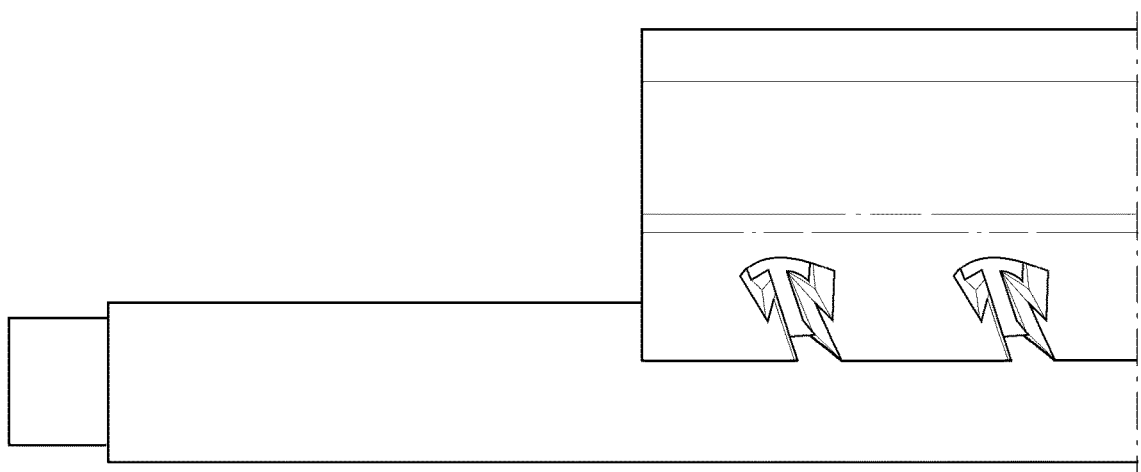
FIG. 10 depicts a pair of secondary conveyor belt scrapers mounted on a support assembly.
Figure 11:
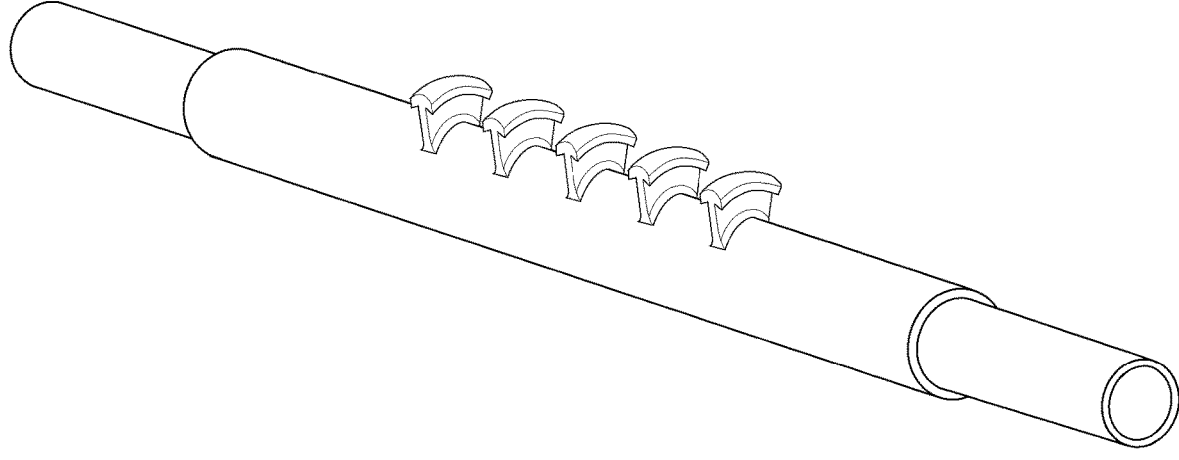
FIG. 11 is a perspective view depicting the support assembly in isolation.

The secondary conveyor belt scraper 200 includes a metallic scraper tip 210 which is integrally formed with an internal stiffening element 220, as depicted in the cross-sectional view of FIG. 9. The stiffening element 220 is bent such that it has a first planar portion 230 and a second planar portion 240 that are angularly offset relative to each other by an angle in the range of about 100 degrees to 150 degrees, and most preferably of about 120 degrees to 135 degrees. The stiffening element 220 provides the scraper tip 210 but also enables the body of the scraper 200 to be sufficiently rigid to scrape the conveyor belt, but remains compliant enough to flex if the scraper tip encounters a solid object.

In the embodiments depicted in the drawings, there are four of the second engagement formations 150 provided in the form of helical projections located on each shaft section 140. Each helical project engages with one conveyor belt scraper 100, 200. However, it will be appreciated that the number of helical projections on each shaft section 140 may be more or less than four. Similarly, whilst each conveyor belt scraper 100, 200 is described as having a single first engagement formation 120 defined by a channel 122, it will be appreciated that two or more channels 122 may be provide in each scraper 100, 200.

The conveyor belt scrapers 100, 200 are describes having parallel sides 105, 107 extending generally orthogonal to the front and rear curved surfaces 104, 106. However, in an alternative arrangement, the parallel sides 105, 107 may alternatively extend generally parallel to the direction that the helical path defined by the channel 122.

Although the invention has been described with reference to specific examples, it will be appreciated by those skilled in the art that the invention may be embodied in many other forms.

The claims defining the invention are as follows:

1. A conveyor belt scraper comprising:
a body having a proximal mounting base and a distal scraping tip, the proximal mounting base includes a first engagement formation configured to engage with a second engagement formation located on a shaft assembly,
wherein the first engagement formation and the second engagement formation are corresponding male and female members which are engaged or disengaged by rotation of the conveyor belt scraper relative to the shaft assembly about a longitudinal axis of the shaft assembly, and
wherein said rotation causes concurrent circumferential and longitudinal displacement of the conveyor belt scraper relative to the shaft assembly.

2. The conveyor belt scraper of claim 1, wherein the first engagement formation and the second engagement formation both extend helically around the longitudinal axis of the shaft assembly.

3. The conveyor belt scraper of claim 1, wherein the first engagement formation is defined by a female channel formed in the proximal mounting base, and the second engagement formation is defined by a helical projection which extends radially away from the shaft assembly in both circumferential and longitudinal directions.

4. The conveyor belt scraper of claim 1, wherein the first engagement formation includes a first locking formation, and the second engagement formation includes a second locking formation.

5. The conveyor belt scraper of claim 4, wherein the first locking formation is defined by a region of increased cross-sectional area located at or near a distal end of the first engagement formation.

6. The conveyor belt scraper of claim 5, wherein the first engagement formation has a generally circular cross-sectional area.

7. The conveyor belt scraper of claim 1, wherein the second engagement formation has a cross-sectional profile having a T-shaped appearance.

8. The conveyor belt scraper of claim 1, wherein the proximal mounting base includes a curved recess extending in a direction which is parallel with the longitudinal axis of the shaft assembly, the curved recess having a cross-sectional profile in the form of a segment of a circle, and corresponding with an outer diameter of the shaft assembly.

9. The conveyor belt scraper of claim 1 wherein the shaft assembly includes a plurality of shaft sections configured to be connected end to end with other like shaft sections.

10. The conveyor belt scraper of claim 9, wherein the shaft sections are connected end to end with corresponding male and female engagement formations.

11. The conveyor belt scraper of claim 9, wherein each shaft section is provided as an open collar having a longitudinally extending channel.

12. The conveyor belt scraper of claim 11, wherein the shaft assembly includes an internal shaft configured to be located within the shaft sections.

13. The conveyor belt scraper of claim 12, wherein the internal shaft includes a longitudinally extending rib configured to engage with the longitudinally extending channel of each shaft section.

14. The conveyor belt scraper of claim 9 further comprising a locking block mounted to one of the shaft sections and configured to abut against an end conveyor belt scraper to prevent the conveyor belt scraper from moving relative to the shaft section.

15. The conveyor belt scraper of claim 14, wherein the locking block is provided in the form of a generally rectangular prism, with a curved channel formed on an underside, the curved channel is configured to abut with the shaft section, such that the locking block is slidable relative to the shaft section parallel to a longitudinal axis, and the locking block can be selectively isolated relative to the shaft section.

16. The conveyor belt scraper of claim 15, wherein a fastener extends through a longitudinally extending slot formed in the locking block.

\* \* \* \* \*